United States Patent
Saita et al.

(10) Patent No.: US 11,043,819 B2
(45) Date of Patent: Jun. 22, 2021

(54) NON-CONTACT POWER TRANSMISSION SYSTEM

(71) Applicant: HONDA MOTOR CO., LTD., Tokyo (JP)

(72) Inventors: Akira Saita, Wako (JP); Tomoaki Nakagawa, Wako (JP); Takuya Iwamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 139 days.

(21) Appl. No.: 16/499,022

(22) PCT Filed: Jan. 31, 2018

(86) PCT No.: PCT/JP2018/003277
§ 371 (c)(1),
(2) Date: Sep. 27, 2019

(87) PCT Pub. No.: WO2018/179811
PCT Pub. Date: Oct. 4, 2018

(65) Prior Publication Data
US 2020/0031241 A1 Jan. 30, 2020

(30) Foreign Application Priority Data

Mar. 31, 2017 (JP) .............................. JP2017-073251

(51) Int. Cl.
*H02J 50/90* (2016.01)
*H02J 7/00* (2006.01)
(Continued)

(52) U.S. Cl.
CPC ............... *H02J 7/00* (2013.01); *B60L 50/60* (2019.02); *H02J 7/025* (2013.01); *H02J 50/10* (2016.02); *H02J 50/80* (2016.02); *H02J 50/90* (2016.02)

(58) Field of Classification Search
CPC ....................................................... H02J 50/90
(Continued)

(56) References Cited

U.S. PATENT DOCUMENTS

2015/0217648 A1* 8/2015 Ichikawa ................ B60L 53/36
320/108
2018/0287434 A1* 10/2018 Ii ........................... B60L 53/122

FOREIGN PATENT DOCUMENTS

JP 5937631 B2 6/2016

OTHER PUBLICATIONS

PCT/ISA/210 from International Application PCT/JP2018/003277 with the English translation thereof.

* cited by examiner

*Primary Examiner* — Edward Tso
*Assistant Examiner* — Ahmed H Omar
(74) *Attorney, Agent, or Firm* — Carrier Blackman & Associated, P.C.; Joseph P. Carrier; William D. Blackman

(57) ABSTRACT

Provided is a non-contact power transmission system with which it is possible to ion a primary coil and a secondary coil more accurately. A vertical distance estimation unit estimates the vertical distance between the center of the primary coil and the secondary coil on the basis of a voltage value detected by a voltage detector. A horizontal distance estimation unit estimates the horizontal distance between the center of the primary coil and the center of the secondary coil on the basis of the vertical distance estimated by the vertical distance estimation unit, the voltage value detected by the voltage detector, and the voltage value-distance information stored on the memory.

6 Claims, 7 Drawing Sheets

(51) Int. Cl.
*H02J 50/80* (2016.01)
*H02J 50/10* (2016.01)
*B60L 50/60* (2019.01)
*H02J 7/02* (2016.01)

(58) Field of Classification Search
USPC .......................................................... 320/108
See application file for complete search history.

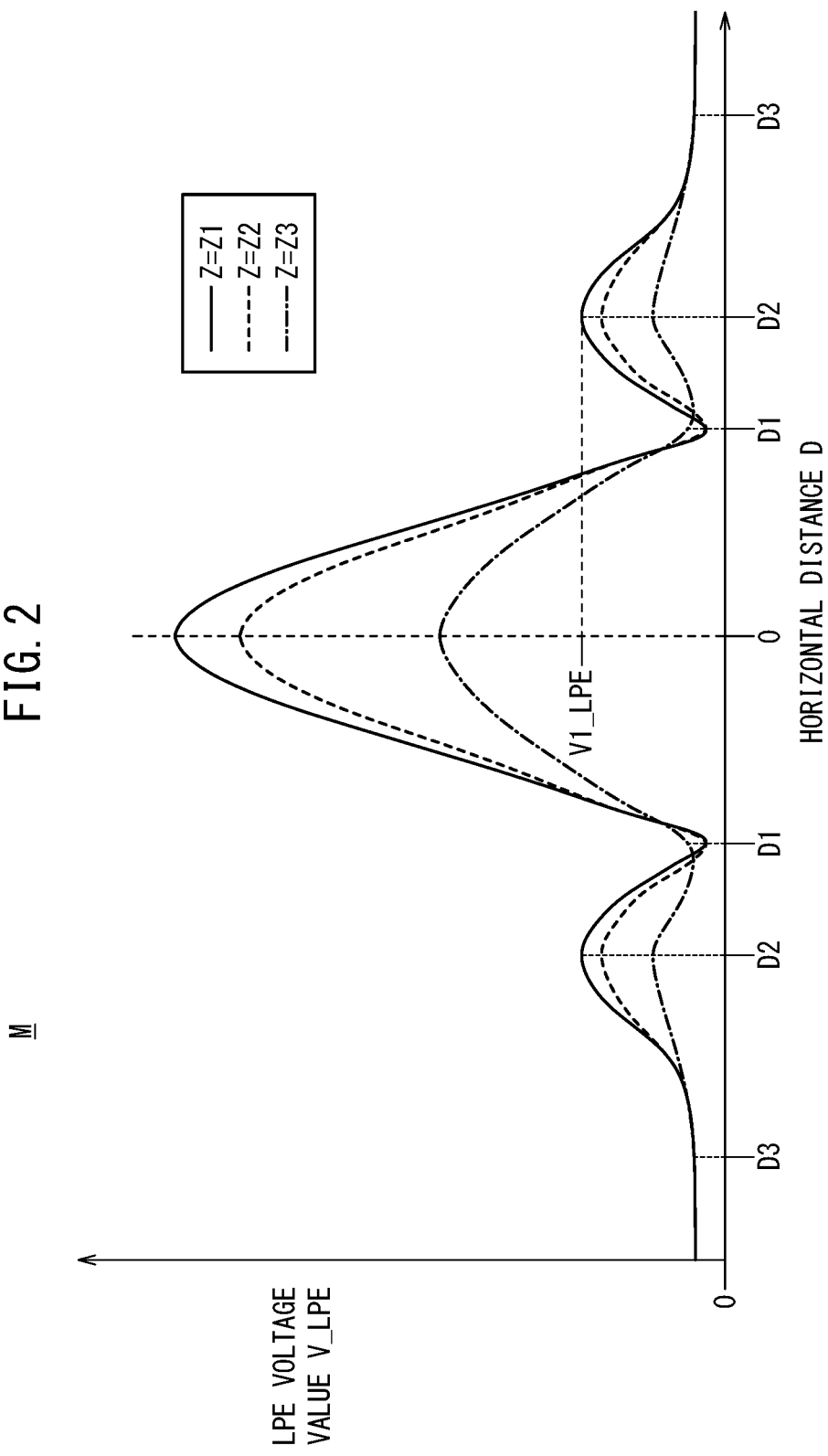

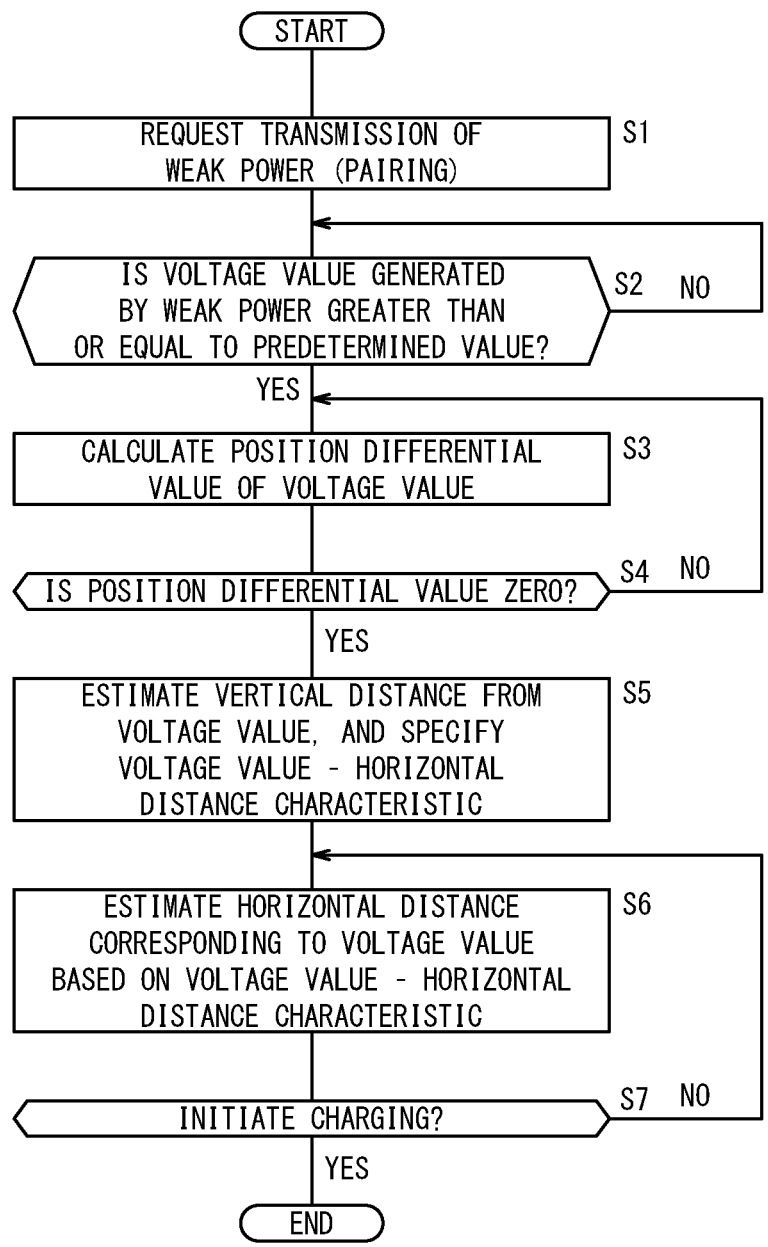

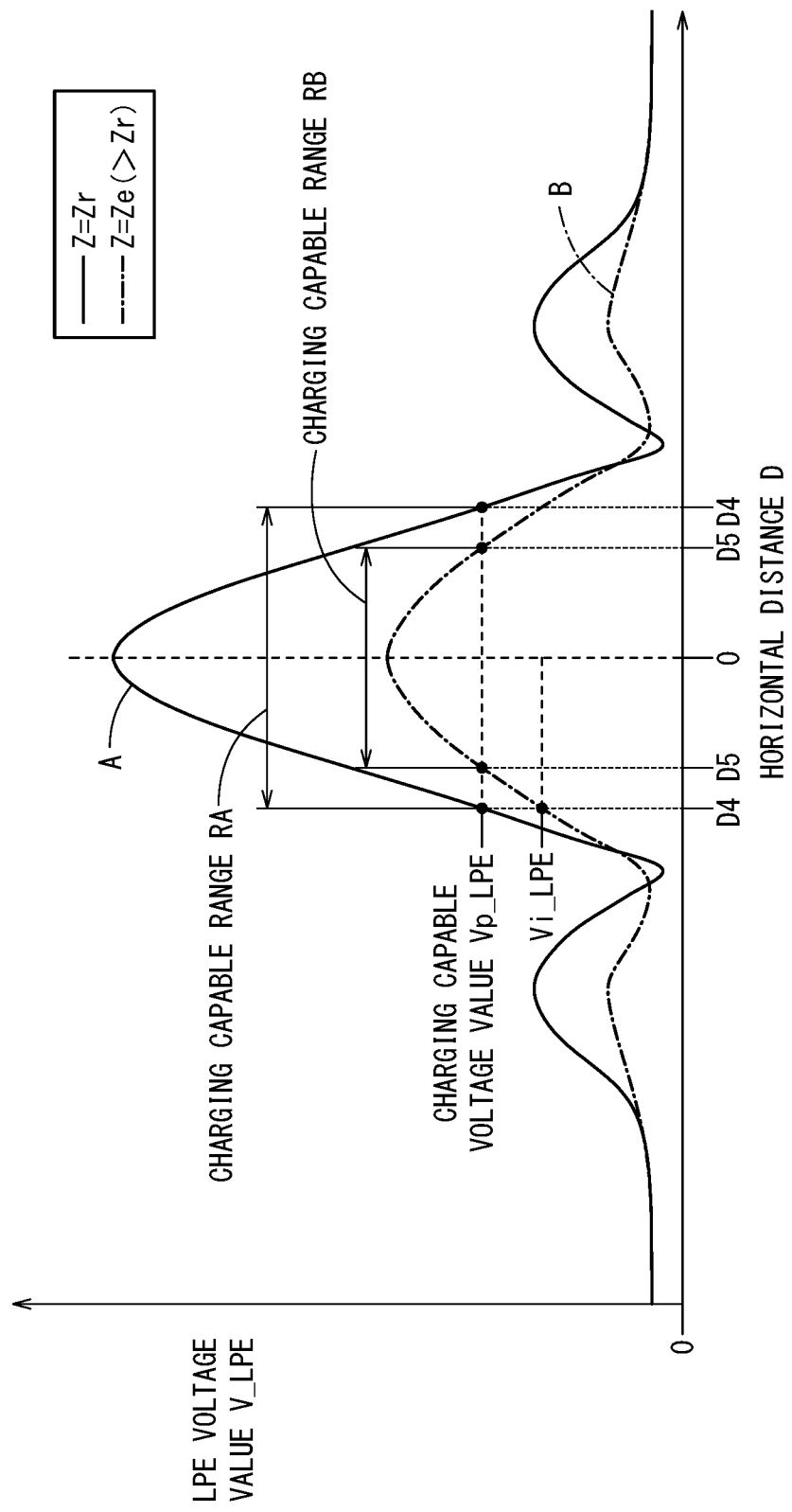

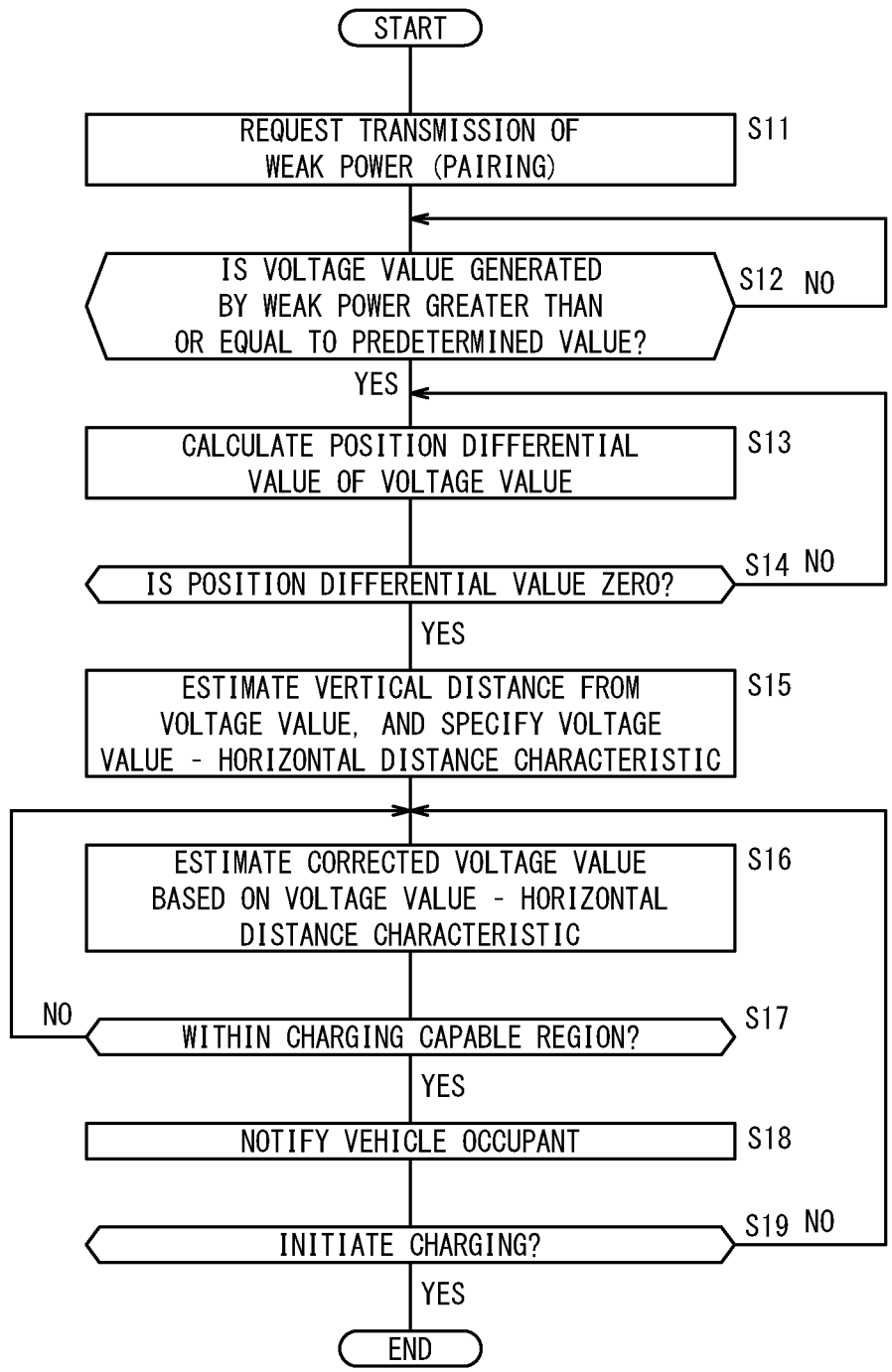

NON-CONTACT POWER TRANSMISSION SYSTEM

TECHNICAL FIELD

The present invention relates to a non-contact power transmission system that transmits electrical power between a primary coil and a secondary coil.

BACKGROUND ART

Along with the development of electric vehicles, for example, electric automobiles and hybrid vehicles and the like, techniques have also been developed in relation to non-contact charging in which the batteries of such electric vehicles are charged in a non-contact manner. In order to carry out non-contact charging efficiently, it is necessary to accurately align a primary coil provided in a charging station with a secondary coil provided on the vehicle.

For example, Japanese Patent No. 5937631 discloses that a weak power is transmitted from the primary coil to the secondary coil, and that alignment between the primary coil and the secondary coil is carried out. It is known that a voltage value generated by the weak power changes corresponding to the distance between the primary coil and the secondary coil. According to the technique of Japanese Patent No. 5937631, the voltage value generated by the weak power is detected on the side of the vehicle, a horizontal distance between the primary coil and the secondary coil is estimated based on the voltage value, and alignment between the primary coil and the secondary coil is carried out.

SUMMARY OF INVENTION

In the technique of Japanese Patent No. 5937631, when carrying out alignment between the primary coil and the secondary coil, although the horizontal distance is considered as the distance between the primary coil and the secondary coil, the vertical distance between the coils is not taken into consideration. For this reason, there is a possibility that an error in positioning may become large.

The present invention has been devised taking into consideration the aforementioned problems, and has the object of providing a non-contact power transmission system which is capable of more accurately carrying out alignment between a primary coil and a secondary coil.

The present invention is characterized by a non-contact power transmission system that transmits charging power in a non-contact manner from a primary coil provided in a charging station to a secondary coil provided on an electric vehicle, the non-contact power transmission system comprising: a primary side control device configured to cause the primary coil to transmit a weak power for aligning the primary coil and the secondary coil; a voltage detector configured to detect a voltage generated by the weak power that is received by the secondary coil; a memory configured to store voltage value-distance information indicative of a relationship between a distance between a reference site of the primary coil and a reference site of the secondary coil, and a value of the voltage corresponding to the distance; a vertical distance estimating unit configured to estimate a vertical distance between the reference site of the primary coil and the reference site of the secondary coil based on the value of the voltage detected by the voltage detector; and a horizontal distance estimating unit configured to estimate a horizontal distance between the reference site of the primary coil and the reference site of the secondary coil based on the vertical distance estimated by the vertical distance estimating unit, the value of the voltage detected by the voltage detector, and the voltage value-distance information stored in the memory.

In accordance with the above-described configuration, the vertical distance between the primary coil and the secondary coil is estimated, and on the basis of such a result, the horizontal distance between the primary coil and the secondary coil is estimated. Therefore, alignment between the primary coil and the secondary coil can be performed in a more accurate manner.

In the non-contact power transmission system according to the present invention, there may further be provided a differential value calculating unit configured to calculate a position differential value of the value of the voltage detected by the voltage detector. In this case, the memory may store, as the voltage value-distance information, correlation information between the horizontal distance and the value of the voltage for each of respective instances of the vertical distance, the correlation information may include information indicating where the position differential value becomes zero, the value of the voltage when the position differential value becomes zero may differ for each instance of the vertical distance, and the vertical distance estimating unit may estimate the vertical distance based on the value of the voltage when the position differential value calculated by the differential value calculating unit becomes zero, and the voltage value-distance information.

In accordance with the above-described configuration, the vertical distance between the primary coil and the secondary coil can be estimated by a simple method in which the position differential value of the voltage value generated by the weak power is calculated.

In the non-contact power transmission system according to the present invention, the value of the voltage when the position differential value becomes zero may be less than the value of the voltage generated by the weak power when the primary coil and the secondary coil are in alignment.

In accordance with the above-described configuration, since the voltage value in the aligned state is not used as a basis for determining the vertical distance, it is possible to determine the vertical distance.

The present invention is characterized by a non-contact power transmission system that transmits charging power in a non-contact manner from a primary coil provided in a charging station to a secondary coil provided on an electric vehicle, the non-contact power transmission system comprising: a secondary side control device configured to cause the secondary coil to transmit a weak power for aligning the primary coil and the secondary coil; a voltage detector configured to detect a value of a voltage generated by the weak power that is received by the secondary coil; a memory configured to store voltage value-distance information indicative of a relationship between a vertical distance between a reference site of the primary coil and a reference site of the secondary coil, a horizontal distance between the reference site of the primary coil and the reference site of the secondary coil, and the value of the voltage corresponding to a distance between the reference site of the primary coil and the reference site of the secondary coil; a vertical distance estimating unit configured to estimate the vertical distance based on the value of the voltage detected by the voltage detector; and a horizontal distance estimating unit configured to estimate the horizontal distance based on the vertical distance estimated by the vertical distance estimating unit, the value of the voltage detected by the voltage detector, and the voltage value-distance information stored in the memory.

In accordance with the above-described configuration, the vertical distance between the primary coil and the secondary coil is estimated, and on the basis of such a result, the horizontal distance between the primary coil and the secondary coil is estimated. Therefore, alignment between the primary coil and the secondary coil can be performed in a more accurate manner.

The present invention is characterized by a non-contact power transmission system that transmits charging power in a non-contact manner from a primary coil provided in a charging station to a secondary coil provided on an electric vehicle, the non-contact power transmission system comprising: a primary side control device configured to cause the primary coil to transmit a weak power for aligning the primary coil and the secondary coil; a voltage detector configured to detect a voltage generated by the weak power that is received by the secondary coil; a memory configured to store voltage value-distance information indicative of a relationship between a distance between a reference site of the primary coil and a reference site of the secondary coil, and a value of the voltage corresponding to the distance; a vertical distance estimating unit configured to estimate a vertical distance between the reference site of the primary coil and the reference site of the secondary coil based on the value of the voltage detected by the voltage detector; and a charging capability estimating unit configured to estimate whether or not a current position of the electric vehicle is a position at which charging is possible in an empty vehicle state based on the vertical distance estimated by the vertical distance estimating unit, the value of the voltage detected by the voltage detector, and the voltage value-distance information stored in the memory.

After having corrected the value of the voltage detected by the voltage detector to a corrected voltage value, which is the value of the voltage detected by the voltage detector in a case that the current position of the electric vehicle is in the empty vehicle state, the charging capability estimating unit may estimate whether or not the current position of the electric vehicle is the position at which charging is possible in the empty vehicle state based on the vertical distance estimated by the vertical distance estimating unit, the value of the voltage after correction thereof, and the voltage value-distance information stored in the memory.

In accordance with the above-described configuration, whether or not the current position of the electric vehicle is a position at which charging is possible in the empty vehicle state is estimated. Therefore, not only is alignment between the primary coil and the secondary coil more accurately performed, but also, even if a vehicle occupant exits from the vehicle after having performed alignment, it is still possible to perform charging in a reliable manner.

According to the present invention, the vertical distance between the primary coil and the secondary coil is estimated, and on the basis of such a result, the horizontal distance between the primary coil and the secondary coil is estimated. Therefore, alignment between the primary coil and the secondary coil can be performed in a more accurate manner.

BRIEF DESCRIPTION OF DRAWINGS

FIG. 2 is a characteristic diagram showing voltage value-distance information;

FIG. 3 is a flowchart showing processing steps performed by an electric vehicle in the first embodiment;

FIG. 6 is a diagram provided to explain the difference between a voltage value in a boarded vehicle state and a voltage value in an empty vehicle state; and FIG. 7 is a flowchart showing processing steps performed by an electric vehicle in the second embodiment.

DESCRIPTION OF EMBODIMENTS

Preferred embodiments of a non-contact power transmission system according to the present invention will be presented and described in detail below with reference to the accompanying drawings.

1. First Embodiment

[1.1. Configuration of Non-Contact Power Transmission System 10]

Figure 1:
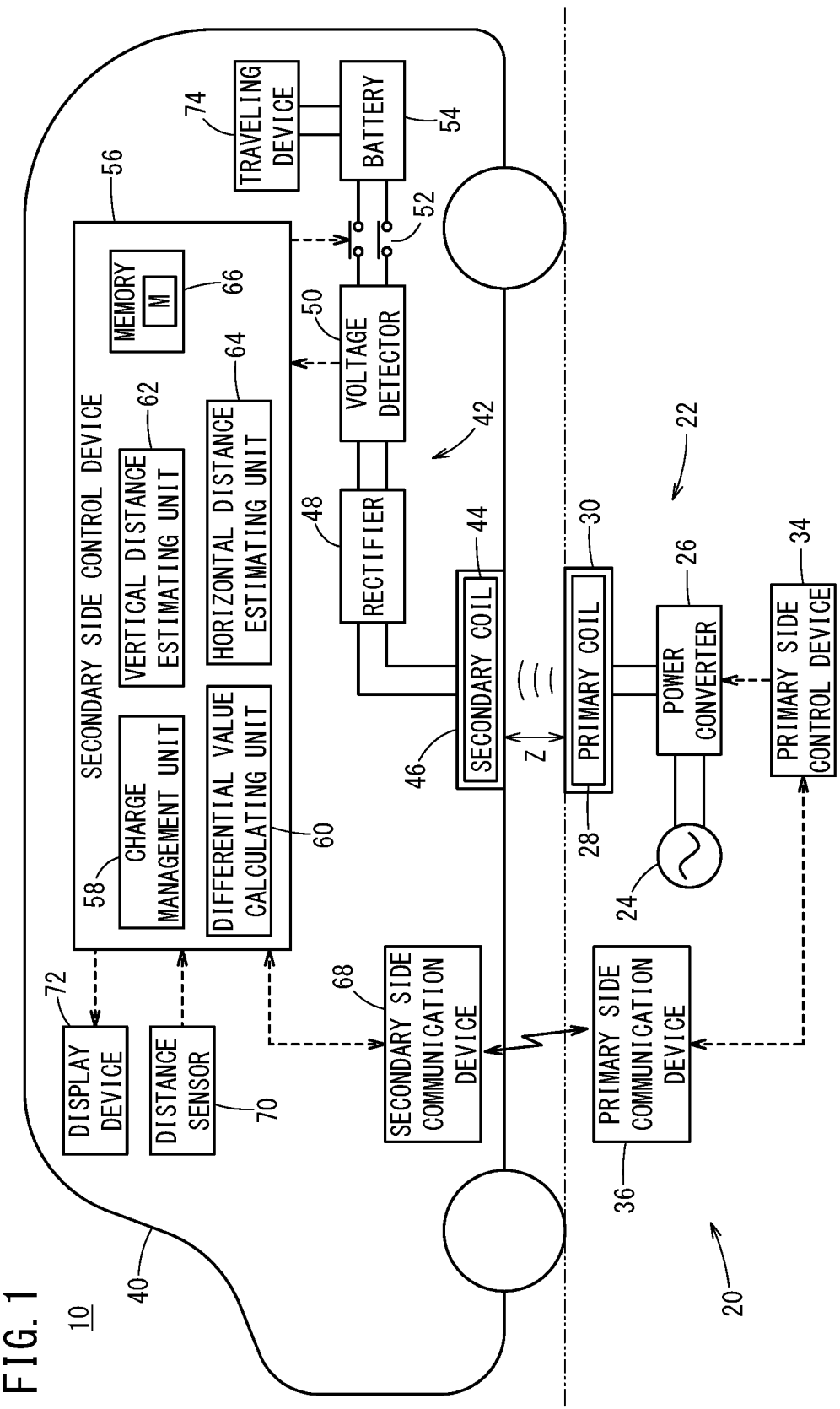
FIG. 1 is a system configuration diagram showing a non-contact power transmission system according to a first embodiment.

The configuration of a non-contact power transmission system 10 according to a first embodiment will be described below with reference to FIG. 1. The non-contact power transmission system 10 is constituted by a charging station 20 of a primary side (power supplying side) disposed on a ground surface (facility surface), and an electric vehicle 40 of a secondary side (power receiving side). In FIG. 1, the constituent elements on the lower side of the two-dot-dashed line indicate the charging station 20, whereas the constituent elements on the upper side of the two-dot-dashed line indicate the electric vehicle 40. In the non-contact power transmission system 10, a battery 54 which is mounted in the electric vehicle 40 is charged in a non-contact manner by the charging station 20.

The charging station 20 principally comprises a power transmission circuit 22, a primary side control device 34, and a primary side communication device 36. The power transmission circuit 22 is equipped with an AC power supply 24, a power converter 26 for converting AC power supplied from the AC power supply 24 into transmitted electric power, a primary capacitor (not shown) for resonance, and a primary coil 28. The primary coil 28 is covered by a primary pad 30 and is disposed on a ground surface (facility surface).

The primary side control device 34 functions as a predetermined operating unit, by a processor (not shown) such as a CPU or the like reading out and executing programs stored in a memory (not shown). In the first embodiment, the primary side control device 34 functions as a power transmission control unit which causes the primary coil 28 to transmit a weak power for aligning the primary coil 28 and a secondary coil 44, and a charging power for charging the battery 54.

The primary side communication device 36 is connected by a communication line to the primary side control device 34. The primary side communication device 36 carries out wireless communications with a secondary side communication device 68 of the electric vehicle 40. For example, a wireless communication protocol such as Wi-Fi (registered trademark) or Bluetooth (registered trademark) or the like can be used.

The electric vehicle 40 principally comprises a power reception circuit 42, the battery 54, a secondary side control device 56, the secondary side communication device 68, a distance sensor 70, a display device 72, and a traveling device 74. The power reception circuit 42 is equipped with a secondary capacitor (not shown) for resonance and the secondary coil 44, a rectifier 48 that rectifies the received electric power (charging power, weak power) which is an AC power received by the secondary coil 44, a voltage detector 50 that detects a voltage generated by the electric power (weak power), and a contactor 52 that switches the electrical connection/disconnection between the power reception circuit 42 and the battery 54. The secondary coil 44 is covered by a secondary pad 46 and is disposed on a lower surface of the electric vehicle 40.

The voltage detector 50 includes, for example, as disclosed in Japanese Patent No. 5937631 discussed above, a parallel circuit composed of a predetermined resistance and a voltage sensor, and a switching element (none of which are shown). The voltage sensor detects a voltage generated at both ends of the resistor at a time that the weak power is received. Such a voltage is referred to as an LPE (Low Power Excitation) voltage.

The battery 54 is constituted from a lithium ion battery or the like, and when the contactor 52 is in a connected state, and the primary coil 28 and the secondary coil 44 are magnetically coupled, the battery 54 is charged through the power reception circuit 42.

The secondary side control device 56 is an ECU which manages the charging process. The secondary side control device 56 functions as a charge management unit 58, a differential value calculating unit 60, a vertical distance estimating unit 62, and a horizontal distance estimating unit 64, by a processor (not shown) such as a CPU or the like reading out and executing programs stored in a memory 66.

The charge management unit 58 collectively manages the charging process. The differential value calculating unit 60 calculates an amount of change in the voltage value V_LPE with respect to a minute travel distance X, or stated otherwise, a position differential value dV/dX in relation to the LPE voltage, based on the voltage value V_LPE of the LPE voltage detected by the voltage detector 50, and the travel distance X of the electric vehicle 40 detected by the distance sensor 70. The vertical distance estimating unit 62 estimates the vertical distance Z between the primary coil 28 and the secondary coil 44 based on the voltage value V_LPE, the position differential value dV/dX, and the voltage value-distance information (see FIG. 2) that is stored in the memory 66. The horizontal distance estimating unit 64 estimates the horizontal distance D (see FIG. 4) between the primary coil 28 and the secondary coil 44 based on the voltage value V_LPE, and the voltage value-distance information (see FIG. 2) corresponding to the vertical distance Z.

The secondary side communication device 68 is connected by a communication line to the secondary side control device 56. The secondary side communication device 68 carries out wireless communications with the primary side communication device 36 of the charging station 20.

The traveling device 74 includes, in addition to a driving force device that generates a driving force in accordance with an operation of the accelerator pedal performed by the driver, a steering device that effects steering in accordance with operations of the steering wheel performed by the driver, and a braking device that generates a braking force in accordance with an operation of the brake pedal performed by the driver. The driving force device includes an electric motor that is supplied with electric power from the battery 54 serving as a drive source.

[1.2. Voltage Value-Distance Information]

In addition to storing various programs and various numerical values such as predetermined values, the memory 66 of the secondary side control device 56 stores in the form of a map M the voltage value-distance information as shown in FIG. 2. The voltage value-distance information is a voltage value-distance characteristic indicative of a relationship between the distance between the reference site of the primary coil 28 and the reference site of the secondary coil 44, and the voltage value V_LPE corresponding to such a distance. More specifically, the voltage value-distance information is a voltage value-distance characteristic indicative of a relationship between the vertical distance Z between the center of the primary coil 28 and the center of the secondary coil 44, the horizontal distance D between the center of the primary coil 28 and the center of the secondary coil 44, and the voltage value V_LPE corresponding to the horizontal distance D and the vertical distance Z.

In the case that the electric vehicle 40 travels into the charging station 20 and carries out alignment of the secondary coil 44 with respect to the primary coil 28, the horizontal distance D changes although the vertical distance Z does not change. In FIG. 2, voltage value V_LPE—horizontal distance D characteristics corresponding to three types of vertical distances Z1 to Z3 (Z1<Z2<Z3) are shown in the form of a two-dimensional graph. As the vertical distance Z becomes larger, the voltage value V_LPE becomes smaller. On the other hand, as the horizontal distance D increases from a zero value, the voltage value V_LPE becomes smaller, and reaches a local minimum value in the vicinity of the distance D1. Furthermore, as the horizontal distance D increases from the distance D1, the voltage value V_LPE increases, and reaches a local maximum value at the distance D2. Furthermore, as the horizontal distance D increases from the distance D2, the voltage value V_LPE decreases, and converges toward its minimum value.

As shown in FIG. 2, the characteristic of the voltage value V_LPE—horizontal distance D is uniquely determined according to the vertical distance Z. In addition, at the distance D2 where the voltage value V_LPE is a local maximum value, the maximum values (voltage value V_LPE) differ for each of the vertical distances Z. Stated otherwise, the maximum value of each characteristic is an individual unique value. Therefore, in the case that the secondary coil 44 is aligned with respect to the primary coil 28, the vertical distance Z from the voltage value V_LPE itself when the voltage value V_LPE becomes a local maximum value, and more specifically, when the position differential value dV/dX becomes zero, can be estimated. Additionally, the characteristic of the voltage value V_LPE—horizontal distance D corresponding to the estimated vertical distance Z can be specified, and the horizontal distance D can be estimated using such a characteristic. In the respective voltage value V_LPE—horizontal distance D characteristics shown in FIG. 2, the position differential value dV/dX is zero when the horizontal distance D is zero in the vicinity of D1 and in the vicinity of D2. Among such instances, the voltage value V_LPE when the horizontal distance D is zero is the maximum value within each of the respective characteristics. However, when the horizontal distance D is zero, this implies that the positions of the center of the primary coil 28 and the center of the secondary coil 44 are already in agreement with each other. Therefore, in the alignment process according to the first embodiment, the maximum voltage value V_LPE is not used as a basis for determining the vertical distance Z. In the first embodiment, that which is used as the basis for determining the vertical distance Z is the voltage value V_LPE (local maximum value) at the position D2 from which the position differential value dV/dX starts to change and becomes zero for the first time when approaching from a distance toward the primary coil 28.

[1.3. Alignment Process]

Figure 4A:
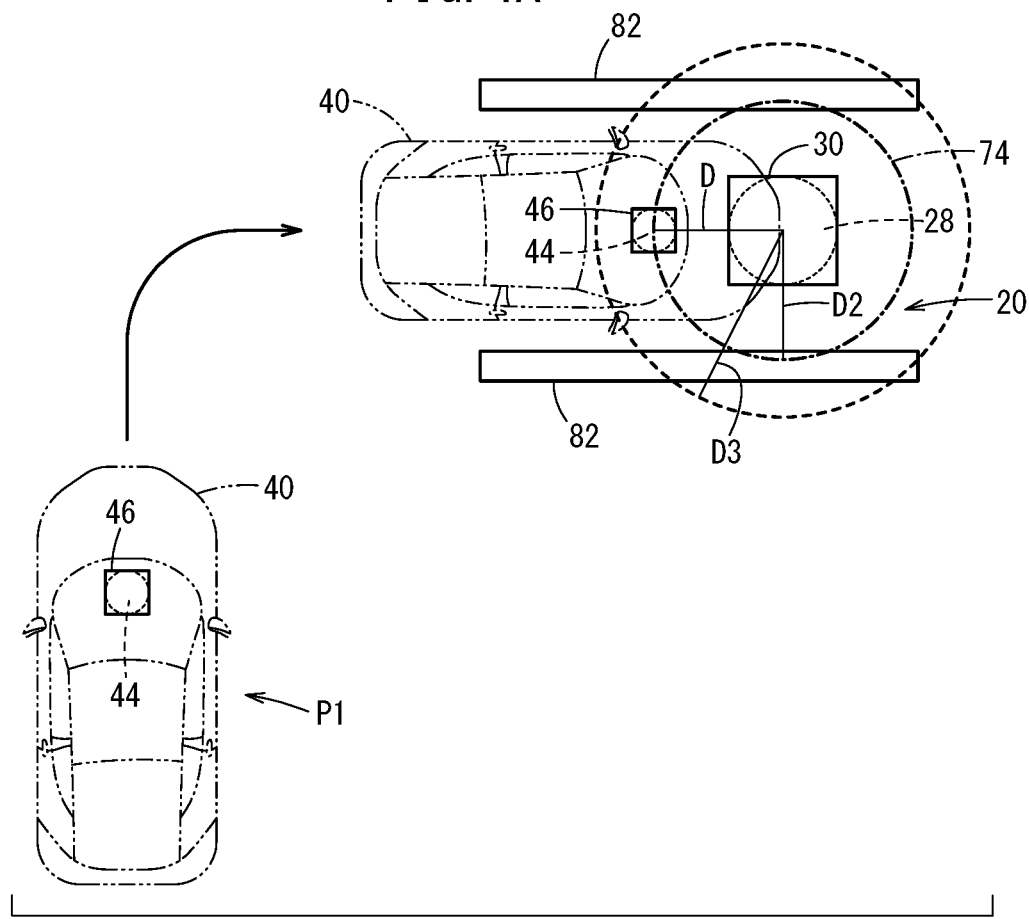
FIG. 4A and FIG. 4B are explanatory diagrams provided to explain a parking operation of the electric vehicle with respect to a charging station.
Figure 4B:
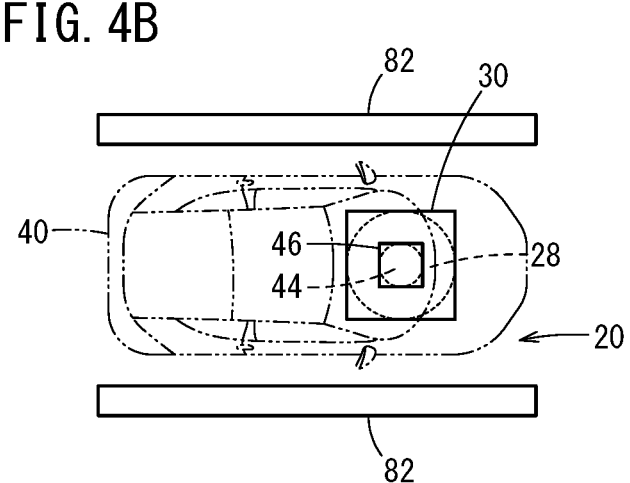

The alignment process carried out on the side of the electric vehicle 40 will be described with reference to FIG. 3. The processing described below is carried out in the case that the driver of the electric vehicle 40 turns on an alignment process start switch (not shown). As shown in FIG. 4A, for example, the charging station 20 is partitioned by lines 82. At a position P1 that is separated away from the charging station 20, the driver turns on a parking start switch, and causes the electric vehicle 40 to travel toward the charging station 20. An operation signal of the parking start switch is transmitted to the secondary side control device 56.

In step S1, the charge management unit 58 issues an instruction to the secondary side communication device 68 to request that the weak power be transmitted. The secondary side communication device 68 performs a pairing operation with the primary side communication device 36 such as authentication or the like, and transmits a signal to request transmission of the weak power. The primary side control device 34 initiates transmission by controlling the power converter 26 in response to the transmission request signal received by the primary side communication device 36. The power converter 26 converts the AC power into a predetermined weak power, and supplies the weak power to the primary coil 28. Upon doing so, the weak power for alignment is transmitted to the exterior from the primary coil 28.

In step S2, the charge management unit 58 determines whether or not the voltage value V_LPE generated by the weak power is greater than or equal to a predetermined value. As the electric vehicle 40 travels, the secondary coil 44 approaches toward the primary coil 28. When the secondary coil 44 arrives at a position (the horizontal distance D3) at which the weak power of the primary coil 28 can be received, the voltage value V_LPE detected by the voltage detector 50 becomes greater than or equal to the predetermined value. In the case that the voltage value V_LPE is greater than or equal to the predetermined value (step S2: YES), the process transitions to step S3. On the other hand, in the case that the voltage value V_LPE is less than the predetermined value (step S2: NO), the process of step S2 is repeated.

In the case of having transitioned from step S2 to step S3, the differential value calculating unit 60 calculates the position differential value dV/dX based on the voltage value V_LPE detected by the voltage detector 50, and the travel distance X detected by the distance sensor 70.

In step S4, the differential value calculating unit 60 determines whether or not the position differential value dV/dX is zero. As shown in FIG. 4A, when the horizontal distance D between the center of the primary coil 28 and the center of the secondary coil 44 becomes the distance D2, the position differential value dV/dX becomes zero. In the case that the position differential value dV/dX is zero (step S4: YES), the process transitions to step S5. On the other hand, in the case that the position differential value dV/dX is not zero (step S4: NO), the process returns to step S3.

In the case of having transitioned from step S4 to step S5, the vertical distance estimating unit 62 estimates the vertical distance Z based on the voltage value V_LPE when the position differential value dV/dX becomes zero, and the map M that is stored in the memory 66. For example, as shown in FIG. 2, in the case that the voltage value V_LPE is V1-LPE, the local maximum value becomes V1-LPE due to the characteristic of the voltage value V_LPE—horizontal distance D of the vertical distance Z1. In this case, the vertical distance estimating unit 62 estimates the vertical distance Z to be Z1. In addition, the characteristic used in subsequent processing is specified as being the characteristic of the voltage value V_LPE—horizontal distance D of the vertical distance Z1.

In step S6, the horizontal distance estimating unit 64 estimates the horizontal distance D corresponding to the voltage value V_LPE, based on the characteristic of the voltage value V_LPE—horizontal distance D specified in step S5 (for example, the characteristic of the vertical distance Z1), and the voltage value V_LPE detected by the voltage detector 50. The charge management unit 58 causes the display device 72 to display the horizontal distance D estimated by the horizontal distance estimating unit 64. The driver operates the traveling device 74 while confirming the display device 72, and thereby carries out alignment of the center of the secondary coil 44 with respect to the center of the primary coil 28.

In step S7, the charge management unit 58 determines whether or not charging is to be initiated. When the driver completes alignment of the center of the secondary coil 44 with respect to the center of the primary coil 28, the electric vehicle 40 is stopped, and a charging start switch (not shown) is turned on. In the case that the charging start switch is turned on (step S7: YES), the series of alignment processing steps is brought to an end. On the other hand, in the case that the charging start switch is not turned on (step S7: NO), the process returns to step S6.

An operation signal of the charging start switch is transmitted to the secondary side control device 56. The charge management unit 58 issues an instruction to the secondary side communication device 68 to request that the weak power be stopped, and to request that the charging power be transmitted. The secondary side communication device 68 transmits, to the primary side communication device 36, a weak power stop request signal and a charging power transmission request signal. The primary side control device 34 stops transmission of the weak power by controlling the power converter 26 in response to the stop request signal received by the primary side communication device 36, and initiates transmission of the charging power by controlling the power converter 26 in response to the transmission request signal received by the primary side communication device 36.

[1.4. Summary of First Embodiment]

The non-contact power transmission system 10 according to the first embodiment is equipped with the primary side control device 34 which causes the primary coil 28 to transmit the weak power for aligning the primary coil 28 and the secondary coil 44, the voltage detector 50 which detects the voltage generated by the weak power that is received by the secondary coil 44, the memory 66 which stores the voltage value-distance information (map M) indicative of the relationship between the horizontal distance D and the vertical distance Z between the center (reference site) of the primary coil 28 and the center (reference site) of the secondary coil 44, and the voltage value V_LPE corresponding to the horizontal distance D and the vertical distance Z, the vertical distance estimating unit 62 which estimates the vertical distance Z between the center of the primary coil 28 and the center of the secondary coil 44 based on the voltage value V_LPE detected by the voltage detector 50, and the horizontal distance estimating unit 64 which estimates the horizontal distance D between the center of the primary coil 28 and the center of the secondary coil 44 based on the vertical distance Z estimated by the vertical distance estimating unit 62, the voltage value V_LPE detected by the voltage detector 50, and the voltage value-distance information stored in the memory 66.

In accordance with the above-described configuration, the vertical distance Z between the primary coil 28 and the secondary coil 44 is estimated, and on the basis of such a result, the horizontal distance D between the primary coil 28 and the secondary coil 44 is estimated. Therefore, alignment between the primary coil 28 and the secondary coil 44 can be performed in a more accurate manner.

The non-contact power transmission system 10 is equipped with the differential value calculating unit 60 which calculates the position differential value dV/dX of the voltage value V_LPE detected by the voltage detector 50. As shown in FIG. 2, the memory 66 stores, as the voltage value-distance information, the map M in which there is set the correlation information between the horizontal distance D and the voltage value V_LPE for each of respective instances of the vertical distance Z. The correlation information includes information (the distance D2 and the voltage value V_LPE at that time) indicating where the position differential value dV/dX becomes zero. The voltage value V_LPE when the position differential value dV/dX becomes zero differs for each instance of the vertical distance Z. The vertical distance estimating unit 62 estimates the vertical distance Z based on the voltage value V_LPE when the position differential value dV/dX calculated by the differential value calculating unit 60 becomes zero, and the voltage value-distance information.

In accordance with the above-described configuration, the vertical distance Z between the primary coil 28 and the secondary coil 44 can be estimated by a simple method in which the position differential value dV/dX of the voltage value V_LPE generated by the weak power is calculated.

The voltage value V_LPE when the position differential value dV/dX becomes zero is less than the voltage value V_LPE generated by the weak power when the primary coil 28 and the secondary coil 44 are in alignment.

In accordance with the above-described configuration, since the voltage value V_LPE in the aligned state is not used as a basis for determining the vertical distance Z, it is possible to determine the vertical distance Z.

[1.5. Modifications of First Embodiment]

The non-contact power transmission system according to the present invention is not limited to the embodiment described above, but it is a matter of course that various alternative or additional configurations could be adopted therein without departing from the essence and gist of the present invention.

For example, in step S2 shown in FIG. 3, instead of determining whether or not the voltage value V_LPE is a predetermined value or greater, a determination may also be made as to whether the position differential value dV/dX calculated by the differential value calculating unit 60 is a value other than zero. When the secondary coil 44 arrives at a position (the horizontal distance D3) at which the weak power of the primary coil 28 can be received, the voltage value V_LPE detected by the voltage detector 50 begins to change. Upon doing so, the position differential value dV/dX, which up until that point had been zero, becomes a value other than zero. At such a timing, the process may transition to step S3.

Further, according to the above-described embodiment, the weak power is transmitted from the primary coil 28 provided in the charging station 20 and is received by the secondary coil 44 provided on the electric vehicle 40. Conversely, the weak power can be transmitted from the secondary coil 44 provided on the electric vehicle 40 and can be received by the primary coil 28 provided in the charging station 20. In this case, the charging station 20 includes a configuration corresponding to the power reception circuit 42, whereas the electric vehicle 40 includes a configuration corresponding to the power transmission circuit 22. Further, the primary side control device 34 possesses the same functions as the secondary side control device 56. Furthermore, during the course of alignment, information of the horizontal distance D is periodically transmitted from the primary side communication device 36 to the secondary side communication device 68, and such information of the horizontal distance D is displayed on the display device 72.

2. Second Embodiment

[2.1. Configuration of Non-Contact Power Transmission System 10]

Figure 5:
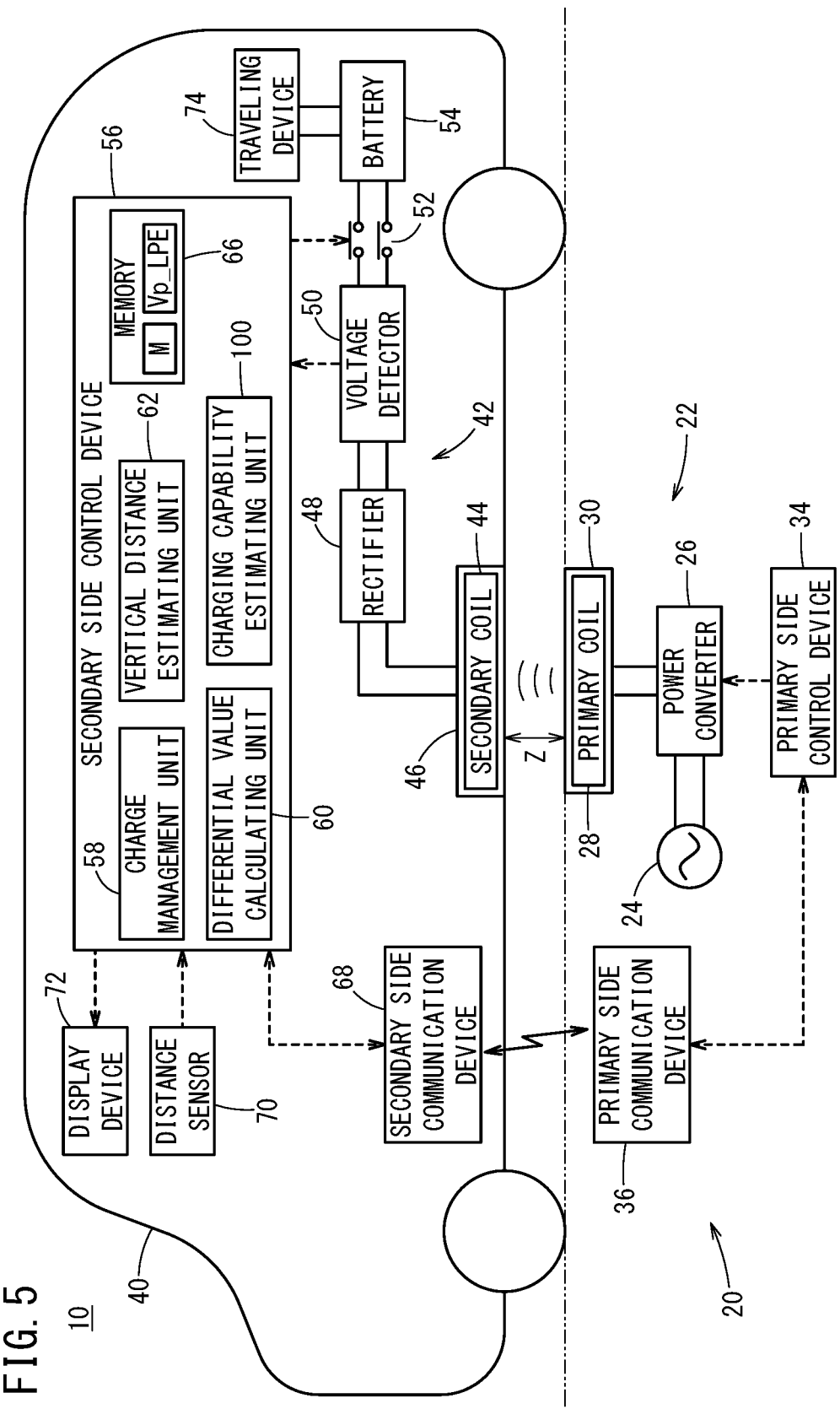
FIG. 5 is a system configuration diagram showing a non-contact power transmission system according to a second embodiment.

The configuration of the non-contact power transmission system 10 according to a second embodiment will be described below with reference to FIG. 5. It should be noted that the same reference numerals are assigned to the same constituent elements as those of the non-contact power transmission system 10 shown in FIG. 1, and detailed description of such features is omitted.

The secondary side control device 56 functions as a charge management unit 58, a differential value calculating unit 60, a vertical distance estimating unit 62, and a charging capability estimating unit 100, by a processor (not shown) such as a CPU or the like reading out and executing programs stored in a memory 66. The charging capability estimating unit 100 estimates whether or not the current position of the electric vehicle 40 is a position at which charging is possible in an empty vehicle state. In addition to the map M of the voltage value-distance information as shown in FIG. 2, the memory 66 stores a voltage value Vp_LPE which is detected at a boundary between a charging capable region and a charging incapable region.

[2.2. Difference between Voltage Value V_LPE in Boarded Vehicle State and Voltage Value V_LPE in Empty Vehicle State]

When charging power is transmitted from the primary coil 28 of the charging station 20 to the secondary coil 44 of the electric vehicle 40, the charging efficiency improves as the primary coil 28 and the secondary coil 44 become closer to one another, whereas when the primary coil 28 and the secondary coil 44 are separated to a certain extent, it becomes impossible to perform charging. Stated otherwise, around the periphery of the primary coil 28, a charging capable region exists that is centered about the primary coil 28, and a charging incapable region exists that is located further outside the periphery thereof.

When the electric vehicle 40 is aligned, whether or not the secondary coil 44 lies within the charging capable region can be estimated by monitoring the voltage value V_LPE generated by the weak power. Since the voltage value Vp_LPE (hereinafter referred to as a charging capable voltage value Vp_LPE) detected at the boundary between the charging capable region and the charging incapable region is constant, by comparing the voltage value V_LPE with the charging capable voltage value Vp_LPE, it is possible to estimate whether or not the secondary coil 44 is within the charging capable region.

Incidentally, although alignment of the electric vehicle 40 is performed while the vehicle occupant is in a boarded vehicle state, cases may occur in which the vehicle occupant exits from the vehicle and the electric vehicle 40 is placed in an empty vehicle state when charging. Normally, the empty vehicle state is higher than the boarded vehicle state. As the vehicle height increases, since the vertical distance Z between the primary coil 28 and the secondary coil 44 becomes greater, the secondary coil 44 becomes separated away from the primary coil 28. For this reason, when the electric vehicle 40 stops at a certain position and the vehicle occupant exits from the vehicle, the charging efficiency is lower than before exiting, and in the worst case, charging of the secondary coil 44 may become impossible.

The difference between the voltage value V_LPE in the boarded vehicle state and the voltage value V_LPE in the empty vehicle state will be described with reference to FIG. 6. In the same manner as in FIG. 2, FIG. 6 indicates characteristics between the voltage value V_LPE and the horizontal distance D. The curve A shown in this instance is a characteristic when the vertical distance Z=Zr, and is a characteristic between the voltage value V_LPE and the horizontal distance D at a time when the electric vehicle 40 is in the boarded vehicle state. The curve B is a characteristic when the vertical distance Z=Ze (>Zr), and is a characteristic between the voltage value V_LPE and the horizontal distance D at a time when the electric vehicle 40 is in the empty vehicle state. A charging capable range RA of the horizontal distance D in the boarded vehicle state is a range of the distance D4 centered about the primary coil 28, and a charging capable range RB (<RA) of the horizontal distance D in the empty vehicle state is a region range of the range distance D5 centered about the primary coil 28. The memory 66 stores such information in the form of a map M.

For example, when the electric vehicle 40 in the boarded vehicle state approaches toward the primary coil 28, the voltage value V_LPE changes according to the characteristic shown by the curve A. When the secondary coil 44 arrives at the position of the distance D4 from the center of the primary coil 28, the voltage value V_LPE detected by the voltage detector 50 becomes the charging capable voltage value Vp_LPE. In this position, if the electric vehicle 40 is in the boarded vehicle state, charging is possible. On the other hand, it will be assumed that the vehicle occupant exits from the electric vehicle 40 at this position and the vehicle is placed in the empty vehicle state. When this occurs, the vertical distance Z between the primary coil 28 and the secondary coil 44 changes from the distance Zr to the distance Ze, and the characteristic between the voltage value V_LPE and the horizontal distance D changes from the curve A to the curve B. In this state (vertical distance Ze, horizontal distance D4), the voltage value V_LPE detected by the voltage detector 50 becomes a charging incapable voltage value Vi_LPE (<Vp_LPE).

In the second embodiment, even if the vehicle is in the boarded vehicle state, positioning of the electric vehicle 40 is performed on the assumption that the vehicle is in the empty vehicle state. More specifically, the voltage value V_LPE detected by the voltage detector 50 is corrected to a voltage value Vc_LPE (hereinafter referred to as a corrected voltage value Vc_LPE) that is detected by the voltage detector 50 when the vehicle is the same position as in the empty vehicle state. Furthermore, the corrected voltage value Vc_LPE and the charging capable voltage value Vp_LPE are compared, and a notification is issued to the vehicle occupant as to whether or not the electric vehicle 40 has reached a position within the charging capable range RB.

[2.3. Alignment Process]

The alignment process carried out on the side of the electric vehicle 40 will be described with reference to FIG. 7. Among the process steps shown in FIG. 7, the processes of step S11 to step S15 are the same as the processes of step S1 to step S5 shown in FIG. 3, and the process of step S19 is the same as the process of step S7 shown in FIG. 3. Therefore, description of these steps will be omitted. Moreover, the processing described below, similar to the processing of FIG. 3, is carried out in the case that the driver of the electric vehicle 40 turns on an alignment process start switch (not shown).

In step S16, the charging capability estimating unit 100 estimates the corrected voltage value Vc_LPE based on the characteristic of the voltage value V_LPE—horizontal distance D specified in step S15. For example, in step S15, it is assumed that the characteristic of the vertical distance Zr indicated by the curve A in FIG. 6 is specified. In the case that the voltage value V_LPE detected by the voltage detector 50 is a charging capable voltage value Vp_LPE, it is estimated from the characteristic of the vertical distance Zr that the horizontal distance D is the distance D4. On the other hand, the voltage value V_LPE detected at the position of the distance D4 in the empty vehicle state is estimated to be Vi_LPE from the characteristic of the vertical distance Ze indicated by the curve B. In this manner, on the basis of the information of the map M, the charging capability estimating unit 100 corrects the voltage value V_LPE detected by the voltage detector 50 to the corrected voltage value Vc_LPE detected at that position in the empty vehicle state.

In step S17, the charging capability estimating unit 100 compares the corrected voltage value Vc_LPE with the charging capable voltage value Vp_LPE to thereby estimate whether or not charging is possible. In the case that the corrected voltage value Vc_LPE the charging capable voltage value Vp_LPE, the vehicle is within the charging capable range RB. In this case (step S17: YES), the process transitions to step S18. On the other hand, in the case that the corrected voltage value Vc_LPE≥the charging capable voltage value Vp_LPE, the vehicle is outside of the charging capable range RB. In this case (step S17: NO), the process returns to step S16.

In the case of having transitioned from step S17 to step S18, the charge management unit 58 provides a notification to the vehicle occupant that the charging capable range RB has been entered into. For example, the notification may be displayed on the display device 72, or a sound may be output by an audio device (not shown). Then, the process transitions to step S19.

[2.4. Summary of Second Embodiment]

The non-contact power transmission system 10 according to the second embodiment is equipped with the primary side control device 34 which causes the primary coil 28 to transmit the weak power for aligning the primary coil 28 and the secondary coil 44, the voltage detector 50 which detects the voltage generated by the weak power that is received by the secondary coil 44, the memory 66 which stores the voltage value-distance information (map M) indicative of the relationship between the horizontal distance D and the vertical distance Z between the center (reference site) of the primary coil 28 and the center (reference site) of the secondary coil 44, and the voltage value V_LPE corresponding to the horizontal distance D and the vertical distance Z, the vertical distance estimating unit 62 which estimates the vertical distance Z between the center of the primary coil 28 and the center of the secondary coil 44 based on the voltage value V_LPE detected by the voltage detector 50, and the charging capability estimating unit 100 which estimates whether or not a current position of the electric vehicle 40 is a position at which charging is possible in the empty vehicle state based on the vertical distance Z estimated by the vertical distance estimating unit 62, the voltage value V_LPE detected by the voltage detector 50, and the voltage value-distance information stored in the memory 66.

More specifically, after having corrected the voltage value V_LPE detected by the voltage detector 50 to the corrected voltage value Vc_LPE, which corresponds to the voltage value V_LPE detected by the voltage detector 50 in the case that the current position of the electric vehicle 40 is in the empty vehicle state, the charging capability estimating unit 100 estimates whether or not the current position of the electric vehicle 40 is the position at which charging is possible in the empty vehicle state.

In accordance with the above-described configuration, whether or not the current position of the electric vehicle 40 is a position at which charging is possible in the empty vehicle state is estimated. Therefore, not only is alignment between the primary coil 28 and the secondary coil 44 more accurately performed, but also, even if the vehicle occupant exits from the vehicle after having performed alignment, it is still possible to perform charging in a reliable manner.

[2.5. Modifications of Second Embodiment]

The non-contact power transmission system according to the present invention is not limited to the embodiment described above, but it is a matter of course that various alternative or additional configurations could be adopted therein without departing from the essence and gist of the present invention. For example, the same modifications as those in the first embodiment can also be used in the second embodiment.

The invention claimed is:

1. A non-contact power transmission system that transmits charging power in a non-contact manner from a primary coil provided in a charging station to a secondary coil provided on an electric vehicle, the non-contact power transmission system comprising:
   a primary side control device configured to cause the primary coil to transmit a weak power for aligning the primary coil and the secondary coil;
   a voltage detector configured to detect a voltage generated by the weak power that is received by the secondary coil;
   a memory configured to store voltage value-distance information indicative of a relationship between a distance between a reference site of the primary coil and a reference site of the secondary coil, and a value of the voltage corresponding to the distance;
   a vertical distance estimating unit configured to estimate a vertical distance between the reference site of the primary coil and the reference site of the secondary coil based on the value of the voltage detected by the voltage detector; and
   a horizontal distance estimating unit configured to estimate a horizontal distance between the reference site of the primary coil and the reference site of the secondary coil based on the vertical distance estimated by the vertical distance estimating unit, the value of the voltage detected by the voltage detector, and the voltage value-distance information stored in the memory.

2. The non-contact power transmission system according to claim 1, further comprising a differential value calculating unit configured to calculate a position differential value of the value of the voltage detected by the voltage detector,
   wherein the memory stores, as the voltage value-distance information, correlation information between the horizontal distance and the value of the voltage for each of respective instances of the vertical distance,
   the correlation information includes information indicating where the position differential value becomes zero,
   the value of the voltage when the position differential value becomes zero differs for each instance of the vertical distance, and
   the vertical distance estimating unit estimates the vertical distance based on the value of the voltage when the position differential value calculated by the differential value calculating unit becomes zero, and the voltage value-distance information.

3. The non-contact power transmission system according to claim 2, wherein the value of the voltage when the position differential value becomes zero is less than the value of the voltage generated by the weak power when the primary coil and the secondary coil are in alignment.

4. A non-contact power transmission system that transmits charging power in a non-contact manner from a primary coil provided in a charging station to a secondary coil provided on an electric vehicle, the non-contact power transmission system comprising:
   a secondary side control device configured to cause the secondary coil to transmit a weak power for aligning the primary coil and the secondary coil;
   a voltage detector configured to detect a value of a voltage generated by the weak power that is received by the primary coil;
   a memory configured to store voltage value-distance information indicative of a relationship between a vertical distance between a reference site of the primary coil and a reference site of the secondary coil, a horizontal distance between the reference site of the primary coil and the reference site of the secondary coil, and the value of the voltage corresponding to a distance between the reference site of the primary coil and the reference site of the secondary coil;
   a vertical distance estimating unit configured to estimate the vertical distance based on the value of the voltage detected by the voltage detector; and
   a horizontal distance estimating unit configured to estimate the horizontal distance based on the vertical distance estimated by the vertical distance estimating unit, the value of the voltage detected by the voltage detector, and the voltage value-distance information stored in the memory.

5. A non-contact power transmission system that transmits charging power in a non-contact manner from a primary coil provided in a charging station to a secondary coil provided on an electric vehicle, the non-contact power transmission system comprising:
   a primary side control device configured to cause the primary coil to transmit a weak power for aligning the primary coil and the secondary coil;
   a voltage detector configured to detect a voltage generated by the weak power that is received by the secondary coil;
   a memory configured to store voltage value-distance information indicative of a relationship between a distance between a reference site of the primary coil and a reference site of the secondary coil, and a value of the voltage corresponding to the distance;

a vertical distance estimating unit configured to estimate a vertical distance between the reference site of the primary coil and the reference site of the secondary coil based on the value of the voltage detected by the voltage detector; and a charging capability estimating unit configured to estimate whether or not a current position of the electric vehicle is a position at which charging is possible in an empty vehicle state based on the vertical distance estimated by the vertical distance estimating unit, the value of the voltage detected by the voltage detector, and the voltage value-distance information stored in the memory.

6. The non-contact power transmission system according to claim 5, wherein, after having corrected the value of the voltage detected by the voltage detector to a corrected voltage value, which is the value of the voltage detected by the voltage detector in a case that the current position of the electric vehicle is in the empty vehicle state, the charging capability estimating unit estimates whether or not the current position of the electric vehicle is the position at which charging is possible in the empty vehicle state based on the vertical distance estimated by the vertical distance estimating unit, the value of the voltage after correction thereof, and the voltage value-distance information stored in the memory.

* * * * *